June 12, 1934. J. L. SCHUELER Re. 19,209

ART OF CONTINUOUS GALVANIZING

Original Filed March 7, 1932 4 Sheets-Sheet 1

Inventor:
Julian L. Schueler
By Bonning & Bonning
Attys.

June 12, 1934. J. L. SCHUELER Re. 19,209

ART OF CONTINUOUS GALVANIZING

Original Filed March 7, 1932 4 Sheets-Sheet 2

Inventor:
Julian L. Schueler
By Bonnell & Bonnell
Attys.

ART OF CONTINUOUS GALVANIZING
Original Filed March 7, 1932 4 Sheets-Sheet 3
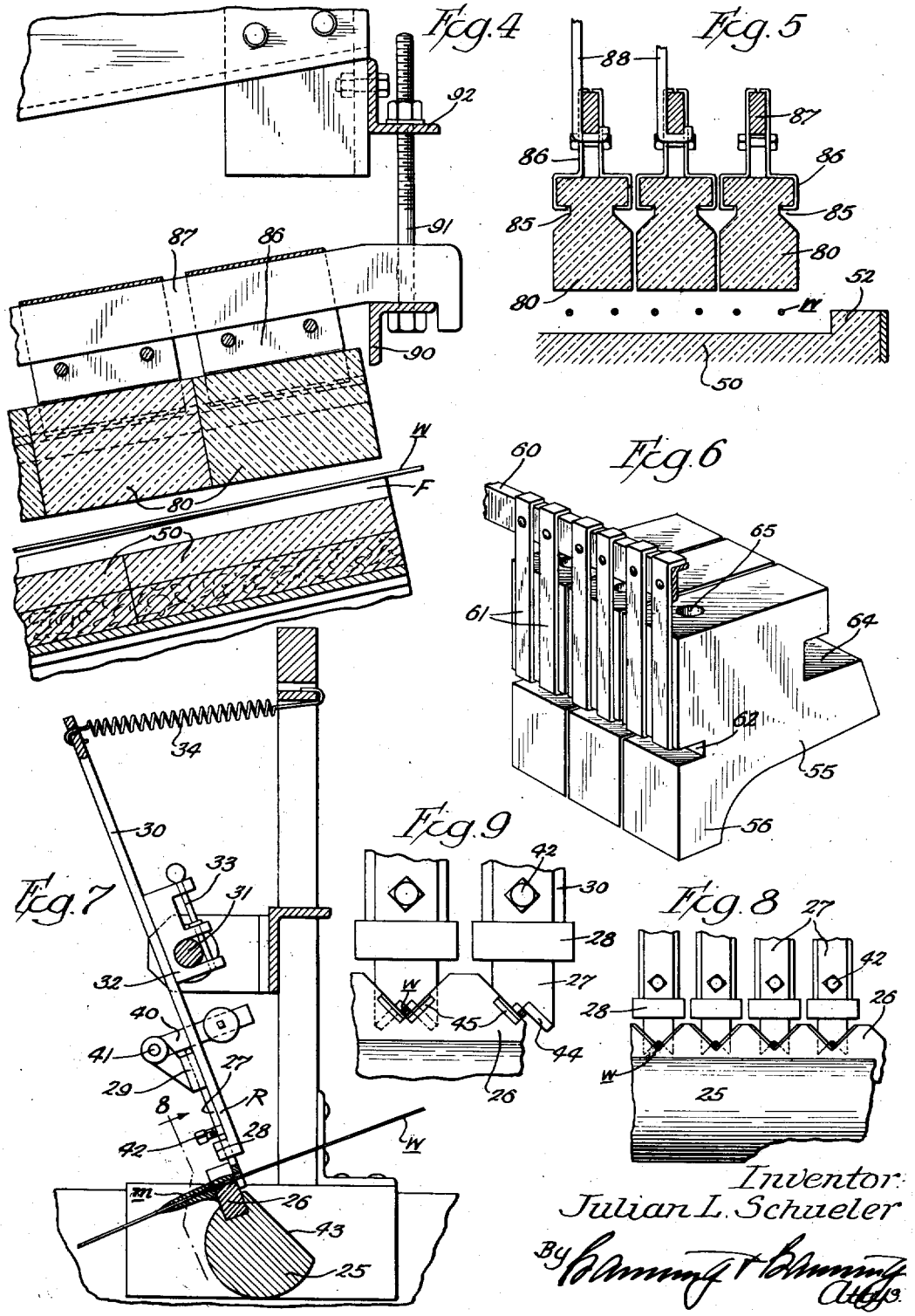
Inventor:
Julian L. Schueler
By Banning & Banning
Attys.

June 12, 1934. J. L. SCHUELER Re. 19,209

ART OF CONTINUOUS GALVANIZING

Original Filed March 7, 1932 4 Sheets-Sheet 4

Inventor:
Julian L. Schueler
By Kenning & Kenning
Attys.

Reissued June 12, 1934

Re. 19,209

UNITED STATES PATENT OFFICE 19,209

ART OF CONTINUOUS GALVANIZING

Julian L. Schueler, Kokomo, Ind.

Original No. 1,936,487, dated November 21, 1933, Serial No. 597,151, March 7, 1932. Application for reissue January 24, 1934, Serial No. 708,167

26 Claims. (Cl. 91—12.1)

This invention relates to a continuous process of coating iron and steel materials. It is applicable particularly to the coating of wire such as is used for woven wire fence, barb wires, and the like. In the ensuing description, the invention will be explained with reference to wire coated with zinc, by way of example, although possibly it may be used to advantage with coatings other than zinc applied to iron and steel materials of different form.

It is a primary object of my invention to galvanize iron or steel wire by an improved process in which the fluidity of the molten zinc coating bath is controlled, in which the amount of coating carried by the wire from the bath is regulated, and in which the coating on the wire is uniformly distributed and smoothed by the action of flames which are directed upon every portion of the wire surface for a suitable interval of time. All of these operations are performed continuously and in immediate sequence. To carry out this process, I have found it advantageous to employ some such apparatus as is illustrated in the accompanying drawings in the manner following:

Figure 1 is a side elevation of a flame apparatus through which a number of wires travel in parallelism immediately upon leaving the coating bath; the lower deflector surface of the apparatus is shown in vertical section to better illustrate the construction;

Fig. 2 which shows in side elevation the flame apparatus exhibits also at one end thereof an associated galvanizing bath and coating regulator, and at the opposite end a guide by which to maintain the wires in proper position within the flame apparatus;

Fig. 2ª represents diagrammatically a transverse section through a galvanizing bath equipped with means for accurately controlling the temperature of the molten metal therein;

Fig. 4 is a similar view of the exit end of the flame apparatus;

Fig. 5 is a detail in transverse vertical section on line 5 of Fig. 3;

Fig. 6 is a fragmentary perspective view looking toward the rear side of flame projector blocks positioned at the receiving end of the flame apparatus;

Fig. 7 is a detail in vertical section showing the coating regulator which is mounted at the exit end of the galvanizing bath;

Fig. 8 is a fragmentary view in transverse section taken on line 8 of Fig. 7, showing in elevation the coating regulator in relation to several wires;

Fig. 9 is a fragmentary detail on an enlarged scale showing certain of the coating regulator parts;

Figure 1:
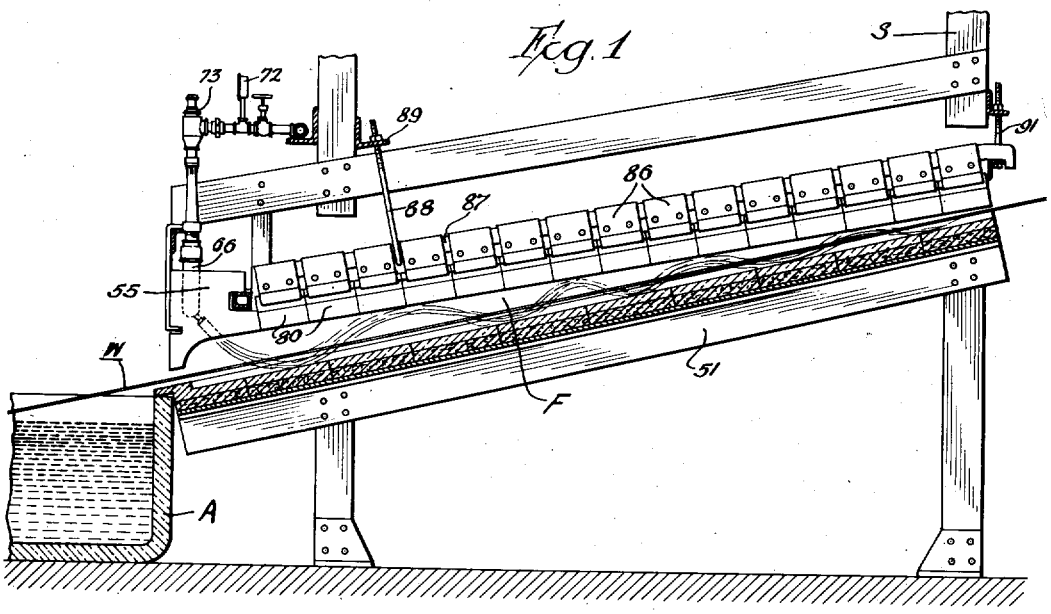

In galvanizing wires according to this invention, it will be found desirable to utilize an annealing furnace, a cooling zone, an acid bath, a water bath, a flux bath, a drier, and a molten zinc galvanizing bath, all as is common practice. Up to the time the wires enter the molten coating bath, they need be subjected to only the usual processes. From this point on, however, the treatment involves a radical departure.

First of all, I aim to maintain the coating bath at a uniform fluidity. Immediately upon emerging from the coating bath, the coating upon the wire is regulated as to thickness by means which is automatic and self-adjusting. Accordingly the amount of coating carried out of the molten bath by the wire is definitely limited. In order that the coating so remaining on the wire may be uniformly distributed and made smooth and even, I subject the wire, immediately upon passing the regulator, to the action of flames which produce a redistribution of the coating as necessary for complete uniformity and smoothness. In this manner, I eliminate all rough points and cover all pin holes and other bare spots. The work performed on the wire from the initial treatment in the annealing furnace, clear through the several units, including the flame apparatus, continues uninterruptedly and irrespective of joints between connected ends of wire bundles. All these operations take place with a minimum of attention while a plurality of wires are traveling at comparatively high speed, so that the process is economical to perform.

I have ascertained that there is a practical limit to the amount of coating that can be evenly distributed around a wire and smoothed by a given amount of flame. It is highly desirable that all coating beyond that which can be acted upon by a flame should be removed in advance by the coating regulator, leaving only a definite maximum weight of coating to be carried on the wire into the zone of flame treatment at a speed of travel which is economically necessary for galvanizing. The regulator employed fits more or less closely around the wire, with provision for opening to allow joints to pass through. The fit of the regulator around the wire is determined with reference to speed of the wire under treatment, the length of its immersion in the molten coating bath, the fluidity of the molten metal itself, and perhaps other factors as well. According to this invention, all such factors should be accurately controlled for best results. The fluidity of the molten coating bath is a function of temperature, but as no suitable molten metal viscosimeter is available for routine testing, I maintain an even viscosity of the molten coating bath by controlling the temperature, plus or minus 5° Fahrenheit. This is accomplished by means of a temperature controller, set to maintain the heat in the bath at a desired point.

Referring now to the drawings, I have shown a bath A adapted to maintain zinc in a molten condition at a controlled temperature. A wire *w* leaving the bath passes through a coating regulator R which is desirably mounted adjacent the exit end thereof. The receiving end of the flame apparatus F is located close to the coating regulator so as to receive the wire while the coating is still in a fluid condition. Beyond the exit end of the flame apparatus is a guide G over which the wire travels before passing on through an air cooling space preliminary to being wound upon a reel. In practice, a large number of wires, perhaps thirty or more, are arranged to travel in parallelism through the galvanizing bath, the coating regulator, the flame apparatus, and over the guide, but for convenience in description I shall refer to a single wire, except only in connection with certain of the parts which are common to two or more wires.

The coating regulator, best shown in Figures 7, 8 and 9, may comprise a cross beam 25 in which is splined a bar 26 having in its upper edge a plurality of V-notches transversely convex, one for each of the wires leaving the bath. The notched bar is inclined slightly so as to lie transversely of the wires emerging from the bath. Co-acting with each of the notches of the bar is a blade 27 slidably held within guides 28 and 29 carried by a lever 30 which is pivotally mounted on a shaft 31 extending transversely above the beam 25 and parallel therewith. Each lever may be equipped adjacent its fulcrum with a yoke-shaped bearing 32 adapted to fit over the shaft whereon it is held with the aid of a gravity pin 33. By pulling this pin out, the lever, together with its associated blade, may be demounted from the shaft. Joined to the upper end of the lever is a tension spring 34 which extends over to a cross frame member 35 for connection therewith.

Associated with each blade is a pressure device which may take the form of a weighted arm 40 pivoted at 41 to a bracket which extends rearwardly from the upper guide 29. Rested upon the upper end of the blade 27 is the arm 40 whose weight is adjustable to vary the pressure imposed upon the blade by which it is maintained in a downward position with a desired tension.

The limit of downward movement of the blade is determined by an adjustable stop 42, a set screw being suggested for the purpose. At its lower edge, the blade is V-notched in opposition to the proximate notch in the upper edge of the bar 26. The blade which is positioned transversely of the wire, the same as is the notched bar, rests against the forward side of the latter so as to be movable away from the notched bar against the tension of the spring 34. This pivotal movement of the lever 30, with consequent separation of the blade from the notched bar, may take place whenever required, as when a wire joint encounters the coating regulator. When this happens, some of the excess coating material *m* previously scraped from the wire is released for discharge upon the forward side of the beam which is provided with a slanting surface 43 along which such material may freely slide down into the bath or elsewhere, as desired.

Each blade notch co-operates with a notch in the bar 26 to provide a small opening through which the wire may pass. The size of these openings may be easily adjusted in accordance with the diameters of the wires to be treated. Thus, with thirty wires, more or less, traveling through the galvanizing bath at one time, there may be a dozen or more different sizes, but the several blades comprised in the coating regulator are individually adjustable to the wires with which they co-operate. It is preferred that the adjustment should be fairly close to within 2/1000ths of an inch or so of the diameter of the wire being treated. In order to withstand the wear resulting from friction by the wire, I find it desirable to utilize inserts 44 and 45 upon the notched faces of the blades and cross bar 26, respectively. These inserts may be welded or otherwise secured fixedly in place and may advantageously be formed of Stellite which is an alloy combining cobalt, chromium and tungsten in substantial parts together with small amounts of iron, sulphur, phosphorous, etc., or other hard material which is resistant to wear and corrosion by molten zinc. In practice, the V-notches so reinforced by hardened inserts will function without appreciable wear over a prolonged period of service.

Figure 2:
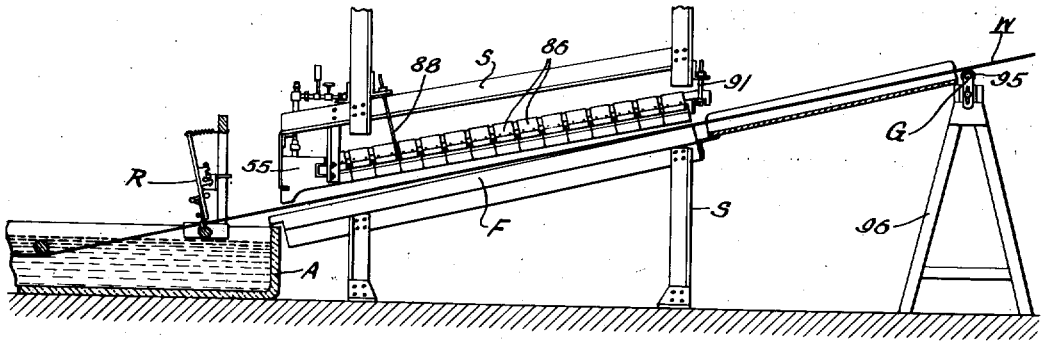
Figure 2A:
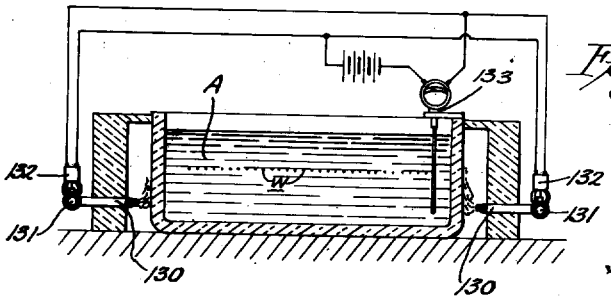
Figure 3:
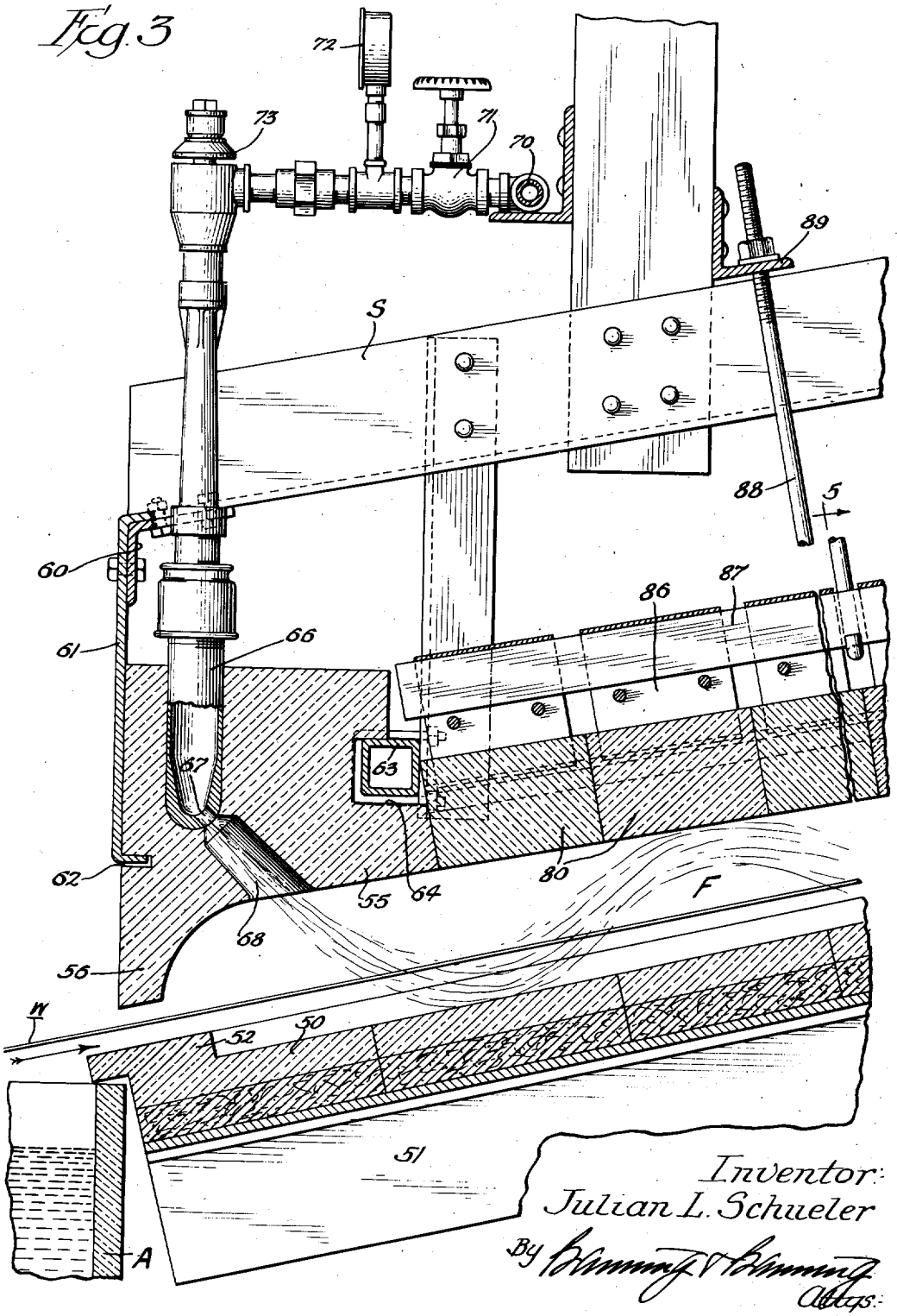
Fig. 3 is an enlarged detail in vertical section showing the receiving end of the flame apparatus.

Coming now to the flame apparatus, I have shown a supporting framework S on which is carried upper and lower deflector surfaces with open spaces around on all four sides. As best shown in Figures 1, 2 and 3, the lower deflector surface may comprise a lining 50 of flame deflector blocks supported on bars 51 mounted upon the framework. Along the sides of the lower deflector surface and across the end thereof proximate to the galvanizing bath, a low wall 52 is desirably provided, as shown.

The upper deflector surface includes a plurality of flame projector blocks 55 extending in a row transversely across the apparatus at the end adjacent the galvanizing unit. Each flame projector block which is made of refractory material is provided at its rear end with a depending wall 56 terminating above the proximate low wall 52 a distance sufficient to accommodate the wires entering the flame apparatus, with proper allowance for whipping and vibration incident to their travel. To mount the several flame projector blocks in place, I may utilize an angle bar 60 extended transversely across the apparatus with its end supported by the framework, and a series of clips 61, each having its upper end connected to the angle bar and its lower end laterally turned to engage within a notch 62 formed in the rear wall of the flame projector block. To support the forward ends of the flame projector blocks, I use a transversely extending bar 63 here shown as a hollow tube having its ends suitably connected to the framework, the tube lying within a notch 64 formed in the forward face of each flame projector block. A cooling medium, such as water, may be circulated through the tube in case it is found desirable.

Referring particularly to Fig. 3, each flame projector block is socketed inwardly at 65 from its upper face to receive one end of a tube 66 closed at its bottom except for an angularly directed hole 67 in communication with the inner end of a passage 68 which opens upon the under face of the flame projector block. This passage is angularly disposed with respect to the direction of wire travel, so that a flame issuing therefrom will be projected downwardly in a forward direction for rebound again and again between the lower and upper deflector surfaces throughout the length of the apparatus. From the tube 66, suitable connections extend to a supply pipe 70 which furnishes liquid or gaseous fuel, a regulating valve 71, a pressure gauge 72, and an air inspirator 73 being interposed in such connections. By the means described, a series of flames, issuing angularly in a row transversely of the apparatus, are projected for repeated rebound between the lower and upper deflector surfaces throughout the length of the apparatus in the manner already indicated.

The remainder of the upper deflector surface is made of like deflector blocks 80 in adjacent relation, and in number and extent sufficient to overlie substantially the entire area of the lower deflector surface. The rearmost row of upper deflector blocks, as shown, abuts the forward face of the flame projector blocks. The front row of upper deflector blocks terminate about even with the corresponding end of the lower deflector surface, and the sides of the upper deflector surface formed by the outermost rows of blocks extending lengthwise of the apparatus terminate, by reference, slightly inside of the low walls 52 upstanding adjacent the edges of the lower deflector surface. According to my invention, adjustment may be made to provide for a gradual decrease of the intervening space toward the exit end of the apparatus. In this manner, the space between the upper and lower deflector surfaces, while remaining open on all sides, is narrowed slightly toward the exit end. The flames operating upon the wires during their travel through the apparatus issue from the rear end forwardly in an angular direction for repeated rebound through a space which may gradually decrease toward the exit end of the flame apparatus.

The upper deflector blocks which are of suitable refractory material may be notched at 85 on opposite sides (see Figure 5) to provide shoulders with which engage clips 86 that extend upwardly for adjustable clamping connection with supporting bars 87 running longitudinally of the apparatus. Each supporting bar is adjustably sustained near its rearward end, as by means of a hook bolt 88 having its threaded end secured adjustably to a transverse angle bar 89. Sustaining the forward end of each supporting bar is a transverse angle bar 90 from which are upwardly extended bolts 91 having their threaded ends adjustably carried by a transverse angle bar 92. By proper manipulation of the several clips 86, each upper deflector block may be individually adjusted, and by adjustment of the several bolts 88 and 91, I provide for raising or lowering of the supporting bars separately or together at either or both ends, with consequent vertical movement of all the flame deflector blocks carried thereby. This is a highly desirable feature as it enables the attendants to make a preliminary setting of each individual flame deflector block and thereafter to adjust an entire row of blocks or the entire upper deflector surface as required for proper clearance of wires, varying widely in size, traveling through the flame apparatus.

It is important that each wire be perfectly guided from the coating regulator through the flame apparatus and to a point therebeyond until the treated coating is sufficiently set to withstand exterior frictional contact. The travel of the wires is produced, as is common practice, by suitable take-up mechanism (not shown) so that the wires are under constant tension. The design of the flame apparatus, as well as its relation to the adjacent units, should be such that it will not contact with any wire, even where it sags the lowest. If necessary, the longitudinal contour of the upper and lower flame deflector surfaces may be slightly curved, as required, to conform to any sag which the wires may take. To properly guide and sustain the wires in relation to the vertically narrow confines of the flame apparatus, I provide, at a point of several feet beyond its exit end, a guide G consisting of a series of vertically adjustable grooved ball-bearing rollers 95, one for each wire, and all mounted, if desired, upon a common framework 96. Each roller bears lightly against the under side of the wire so as not to disturb the coating which at that point may still be somewhat soft. The contact of these rollers with the wires is sufficient, however, to prevent undue vibration or whipping, with consequent disturbance of the coating in process of being redistributed, smoothed, and evened by the treatment applied in the flame apparatus.

Figure 10:
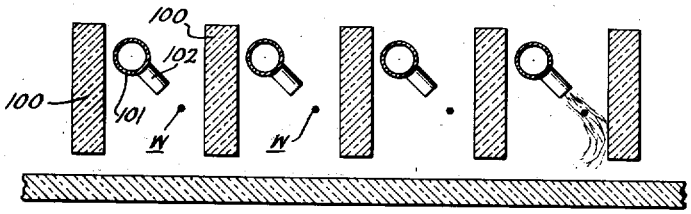
Fig. 10 is a transverse vertical section through a flame apparatus of modified construction.

It is feasible to utilize various forms of apparatus for carrying out this invention. The one already described is admirably suited to meet all requirements, as I have demonstrated in practice. As suggestive of certain modifications which may optionally be used, I have shown in Figure 10 a construction having a lower deflector surface over which is arranged a plurality of spaced vertical refractory walls 100, forming between them alleys each adapted for the reception of a wire.

Extending longitudinally within each alley is a fuel pipe 101 mounting a plurality of angularly directed burners 102 adapted to project flames against the wire which lies proximate to one wall. In this case, the flames will strike against one side of the wire and pass beyond to bound off of the adjacent wall, down to the deflector surface and thence back, the resulting effect being an impingement by the flames on all sides of the wire with a consequent redistribution, evening and smoothing of the molten coating thereon. With this construction no upper deflector surface need be employed, although one may be used, if desired.

Figure 11:
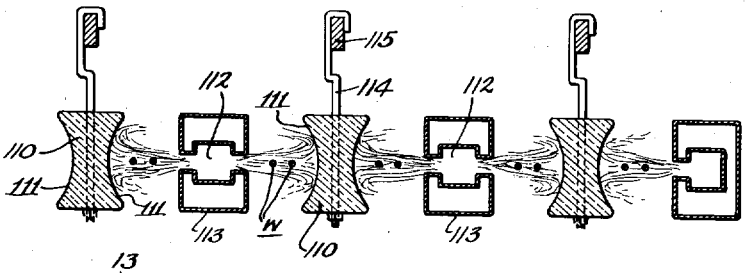
Fig. 11 is a similar view showing a further modification of the flame apparatus.

A further modification is suggested in Fig. 11, wherein I have shown a series of flame deflector blocks 110 having opposite faces 111 concave in a direction lengthwise of the apparatus. Between the rows of blocks so formed, I provide a fuel line 112 with oppositely arranged openings constituting burners form which flames are directed against one or more wires which are positioned to travel between the burners and the confronting row of blocks. In the construction shown, the fuel line is jacketed at 113, permitting the use of a cooling medium to prevent attainment of excessive temperatures. In this form of apparatus the flames playing upon the wires rebound upon contact with the concave faces of the blocks so as to impinge upon the wire side opposite the burners, to assure a proper treating action at all points. The blocks may be adjustably carried upon bolts 114 hooked over supporting bars 115 in the manner shown. Upper and lower deflector surfaces may optionally be employed with this construction.

Figure 12:
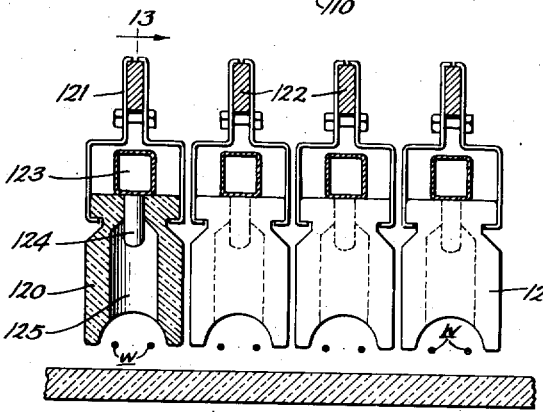
Fig. 12 shows also, in transverse section on line 12 of Fig. 13, one additional modification of the flame apparatus.
Figure 13:
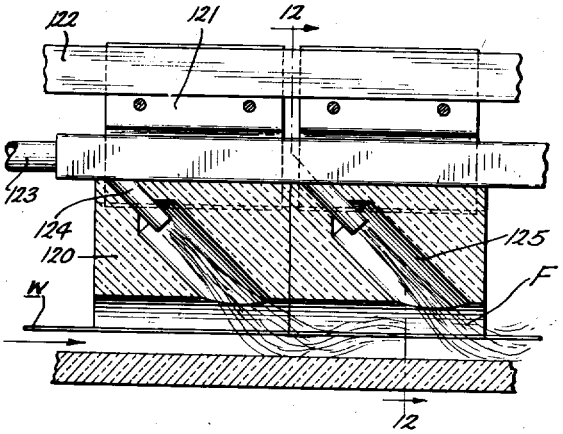
Fig. 13 is an enlarged detail in vertical section taken on line 13 of Fig. 12.

In Figs. 12 and 13, I have shown a further modification in which the wires travel, desirably in groups of two over a lower deflector surface, with a row of blocks 120, concave on their under faces providing a longitudinal archway over a single group of wires, as shown. These blocks may be supported adjustably by clips 121 which connect with supporting bars 122 adjustably supported at opposite ends if desired. Over each row of flame deflector blocks is a fuel conduit 123 from which depend nozzles 124 extending angularly in a forward direction. Each nozzle is fitted within the upper end of an angularly disposed socket 125 which opens out upon the lower face of the block. In this manner, I provide for the issuance of flames from the under face of the blocks, one behind the other in a row, and projected forwardly upon a lower deflector surface so as to rebound for impingement upon the wire side opposite to the flame deflector blocks above. This construction differs from the others principally in that a series of flames projecting angularly in a single row from the center of an archway impinge upon a plurality of wires traveling therebelow within the confines thereof so as to receive treatment throughout the length of their travel within the flame apparatus.

According to this invention, I include (1) maintenance of proper fluidity of the coating bath through a close control of temperature; to within, say, plus or minus 5° Fahrenheit; (2) removal of excess coating from the wire as it emerges from the bath so as to leave on the wire only so much coating as may be redistributed, smoothed, and evened by the flame action; (3) regulable impingement of the coating by flames acting upon every portion of the wire surface through an extended treating zone and for a time interval sufficient to accomplish this result; and (4) guidance of each wire throughout the zone of flame treatment and for a distance therebeyond to safeguard against contact with proximate parts. By maintaining the temperature of the zinc bath close to a temperature which is found suitable, the fluidity of the coating adhering to the wire will be substantially uniform. The skimmings, foreign matter, and coating material carried out of the bath in excess of that which the flames will even and smooth, are taken off by the regulator, and, with each opening of the notched blades, occasioned periodically by passage of joints and/or accumulated skimmings, such removed material is automatically released and the coating regulator cleared. This is important, because the accumulation of dross and skimmings by the regulator affects somewhat the amount of coating remaining on the wire when coming into the zone of flame treatment. By maintaining uniform viscosity of the molten bath, variation in the amount of coating, i. e., the weight per unit area of wire surface, is held to a minimum.

Heretofore there has been considerable variation in the amount of coating left on the wire after leaving a V-notched bar, resulting in the finished product having one characteristic for, say, one thousand feet or more and another different characteristic for a succeeding one thousand feet or more. All such variable factors are removed by the means and process set forth herein which has many advantages from a commercial standpoint. The wire may be perfectly treated when advanced at a fairly rapid speed depending upon its gauge and the consequent amount of coating which it may carry. The resulting coating is found to be more uniformly distributed over and around the wire surface, as determined by a copper sulphate test.

For closely controlling the temperature of the bath which is desirably insulated to prevent loss of heat by radiation, some such apparatus may be used as is represented diagrammatically in Fig. 2[a]. Here I have shown heating devices in the form of burners 130 receiving liquid or gaseous fuel from supply pipes 131 equipped with regulating valves operable by means 132 electrically energized through actuation of a control 133 which is responsive to temperature conditions in the bath, the operation being automatic at all times so as to maintain the bath at approximately the temperature for which the control instrument is set. The clearance of each coating regulator is also adjustable to accord with the diameter of the wire passing therethrough, and once a setting is made the regulator automatically maintains the opening to a size which removes excess coating to the precise extent desired. The amount of coating carried by the wire from the bath depends upon several factors one of the most important, viz., the bath temperature, being usually quite variable. By maintaining a close control over the temperature of the molten bath, a substantially uniform weight of coating per unit of surface area is carried out by the wire, making possible thereafter by means of the regulator to limit the weight of such coating to a point at which the action by flames impinging upon every portion of the wire surface will perform a uniform redistribution (as necessary), and smoothing of all the remaining coating.

As a specific example of the application of this process to the galvanizing of wires, I have passed a wire of 12½ gauge (.0985" diameter) through a molten zinc coating bath of approximately 860° F. for a distance of fifteen feet. Immediately upon leaving the coating bath the wire was acted upon by the regulator the opening of which was maintained at approximatedly .002" larger than the diameter of the wire. The wire was traveling continuously at a speed of 107 feet per minute. The weight of the coating was approximately .48 ounces per square foot of wire surface. The copper sulphate test was four minutes at the first failure, and five and one-half minutes for complete failure. In another case I have treated similarly an 11 gauge wire (.1205" diameter) which moved at a speed of 90 feet per minute acquiring in its travel a coating which weighed approximately .70 ounces per square foot of wire surface. When subjected to the copper sulphate test, first failure of the wire was four minutes, and complete failure at five and one-half minutes. The flame for smoothing the wire was exactly the same in both cases. By varying the flame, instead of the speed of wire travel, the same results are obtainable within certain practical limits.

In the above cases I used manufactured gas, pressure about 7 pounds, which was passed through an air inspirator, having a gas opening of about .068" diameter. By means of regulating valves for the gas and air, the flame may be maintained at a point suitable for uniform distribution and smoothing of the coating upon the wire surface. This process, when carried on as above indicated, may be used commercially with thirty wires more or less running side by side, simultaneously and continuously, each wire and the treating conditions being subject to independent control in the manner suggested. The flame action which follows immediately upon delimiting of the weight of coating applied to each wire, accomplishes the dual purposes of (1) maintaining the coating in a molten condition while (2) redistributing every portion of the coating, as necessary, to assure its even and smooth spread over the wire surface.

A freshly applied molten coating, which is regulated as to amount and then subjected to the action of a flame in the manner above described, is thereby distributed evenly over and around the surface of the body, and its own surface is also smoothed. Such a treatment comprises, in effect, two steps, viz., (1) regulation of the amount of coating and (2) evening and smoothing of the coating finally remaining on the wire. So far as concerns the attainment of evenness and smoothness, the treated coating of my invention may be compared with "wiped" coatings as heretofore produced by a single step process without the use of a flame; but the results according to my process are superior, the coating may be more closely regulated as to amount, the coating finally remaining on the wire is evened and smoothed more uniformly and perfectly, and the operations which produce these results are performed with greater speed and certainty. A coating which is wiped by the apparatus and process of my invention will conform to very exacting specifications such as are commonly established for wires in particular.

In the various forms of apparatus herein suggested, a number of coated bodies, such as wires (round, flat, etc.) may travel along in parallelism continuously in a linear direction to be simultaneously treated. The flame apparatus is desirably heat-insulated, top and bottom, and may operate with any selected number of flames, depending upon the number of wires or other bodies passing through the apparatus. In case it is desired to operate the apparatus at reduced capacity, then it becomes unnecessary to employ flames in the unused part of the apparatus, thus effecting a large economy in the expense of operation.

I would have it noted also that the coating regulators are independent units permitting of any one or more of them to be adjusted, demounted, or otherwise worked on, without disturbing the remaining regulators. The same is true of the flame projector blocks. In the event of a break in one of the wires passing through the apparatus, an attendant may easily remove the wire from its associated regulator and draw it out to the side of the flame apparatus, all without interference with the remaining wires under treatment.

I claim:

1. An apparatus for continuous flame-treating of a metallic body freshly coated with molten metal in which is comprised opposed coacting deflector surfaces adjacent which the coated body is moved, and means for projecting a flame angularly from one of said surfaces toward another surface for repeated rebound from one surface to another to produce a flame impingement upon the molten coating with consequent uniform distribution and smoothing thereof.

2. An apparatus for continuous flame-treating of a metallic body freshly coated with molten metal in which is comprised opposed deflector surfaces defining between them a space open on all sides and narrowing toward one end, means for moving the coated body free of contact with the deflector surfaces through the space between them toward the narrower end, and means for projecting a flame from one surface angularly toward the other for repeated rebound between the two surfaces whereby to produce a flame impingement upon the molten coating with consequent uniform distribution and smoothing thereof.

3. An apparatus for continuous flame-treating of a metallic body freshly coated with molten metal in which is comprised opposed deflector surfaces defining between them a space which is open at opposite edges, means for projecting a flame from one surface angularly toward the other for repeated rebound between the two surfaces in a direction toward one of the open edges whereby to produce a flame impingement upon the molten coating of the body passing between said surfaces away from the flame, and means for adjusting one surface relative to the other whereby to vary the space therebetween.

4. An apparatus for continuous flame-treating of a metallic body freshly coated with molten metal in which is comprised a pair of opposed deflector surfaces defining between them a space open at the edges of the two surfaces, means for projecting a flame from one surface angularly toward the other for repeated rebound between the two surfaces through the major portion of the distance between two opposite edges thereof, and means for adjusting selected portions of one flame deflector surface toward or from the other whereby to vary the clearance at points therebetween.

5. An apparatus for continuous flame-treating of a metallic body freshly coated with molten metal in which is comprised upper and lower deflector surfaces in opposed relation defining between them a narrow space open at the edges of the two surfaces, the upper deflector surface comprising a plurality of independently adjustable deflector blocks movable toward and from the lower deflector surface, vertically adjustable means supporting a plurality of blocks comprised in the upper deflector surface adapted to raise and lower such blocks in unison, and means for projecting a flame from one surface angularly toward the other for repeated rebound between the two surfaces for a substantial distance throughout the space therebetween.

6. An apparatus for continuous flame-treating of a metallic body freshly coated with molten metal in which is comprised a transversely arched deflector surface extending longitudinally of the movement of the body, and means for projecting a flame toward the deflector surface for rebound therefrom longitudinally of the archway whereby to impinge upon various circumferential portions of the surface of a molten coating freshly applied to a body passing between the archway and the flame projecting means.

7. An apparatus for continuous flame-treating of a metallic body freshly coated with molten metal in which is comprised a deflector surface made up of a plurality of independently adjustable deflector blocks movable in parallelism into and out of a common plane whereby to change the position of such plane or any selected part thereof, and means for projecting a flame for rebound against the flame deflector surface over a substantial portion of its surface.

8. An apparatus for continuous flame-treating of a metallic body freshly coated with molten metal in which is comprised a deflector surface made up of a plurality of independently adjustable deflector blocks movable into and out of a common plane, adjustable means supporting a plurality of the deflector blocks adapted to move the same in unison into or out of a plane common with the remaining deflector blocks, and means for projecting a flame against the deflector surface for rebound therefrom upon the molten coating of a body passing close to the deflector surface.

9. In combination with a molten galvanizing bath, means for regulating in accordance with a desired adjustment the molten coating to remain upon a metallic body emerging from the bath, and flame-treating means acting upon every portion of the molten coating to uniformly distribute and smooth said coating without removing any of the coating remaining upon the body.

10. In combination with a molten galvanizing bath, a coating regulator in which is comprised co-acting parts having opposed surfaces in offset relation adapted to remove a selected amount of molten coating from a metallic body which is passed between such surfaces, and a fixed single pivotal support for one of said parts permitting it to yield away from the other in the direction of body movement in response to an enlargement carried by the body, and means to even and smooth the remaining coating upon the body without removal of coating therefrom.

11. In combination with a molten galvanizing bath adapted to apply a molten coating to a wire traveling therethrough, a coating regulator in proximity to the bath comprising two parts having opposed V notches between which the wire is passed, a single fixed pivotal support for one of said parts, and means for maintaining the notched faces in a predetermined spaced relation close to the wire surface whereby a regulated amount of molten coating is removed from the wire while passing therethrough, and means to even and smooth the remaining coating upon the wire without removal of coating therefrom.

12. In combination with a molten galvanizing bath adapted to apply a coating to a wire traveling therethrough, a coating regulator in proximity to the bath comprising automatically adjustable parts having opposed notches closely fitting over the wire, and a fixed single pivotal mounting for one of the said parts permitting its separation from the other when required for passage of an enlargement therethrough, and means to even and smooth the remaining coating upon the wire without removal of coating therefrom.

13. In combination with a molten galvanizing bath adapted to apply a coating to a wire traveling therethrough, a coating regulator in proximity to the bath comprising automatically adjustable parts formed with opposed notches closely fitting over the wire, one of said parts lying in offset but adjacent relation to the other, and means providing a single fixed pivotal support for one part permitting it to move away from the other when required for passage of an enlargement therethrough, and means to even and smooth the remaining coating upon the wire without removal of coating therefrom.

14. In combination with a molten galvanizing bath adapted to apply a coating to a wire traveling therethrough, a coating regulator in proximity to the bath comprising two parts having opposed V notches faced with material resistant to wear and corrosion by molten zinc between which facing material the wire is passed for removal of excess molten coating applied to the wire.

15. In combination with a molten galvanizing bath, a flame-treating apparatus having opposed deflector surfaces narrowly spaced and open at opposite ends adapted to receive between them a wire traveling from the bath with applied coating still in molten condition, means for directing from the deflector surfaces a flame which impinges upon opposite sides of the wire, and means for guiding the wire within the space defined by the opposed deflector surfaces free of contact with such surfaces.

16. In combination with a molten galvanizing bath, means for regulating the coating applied to a metallic body emerging from the bath, comprising two cooperating offset parts, one fixed and the other yieldable in the direction of body travel, adapted to remove from opposite surfaces of the body all coating in excess of that finally to remain thereupon, and means to even and smooth the remaining coating upon every portion of the surface of the body.

17. In combination with a molten galvanizing bath, a flame treating apparatus in which is included an adjustable flame deflector surface and flame projector means both positioned adjacent a wire traveling from the bath with applied coating still in molten condition, and means adjustable relative to the flame deflector surface and movable into light contact with the wire for reducing whipping and vibration of the wire adjacent such flame deflector surface and flame projector means.

18. The process of galvanizing a metallic body which comprises the successive steps continuously performed of coating the body with a molten metal, removing from the body all molten metal in excess of that finally to remain thereupon, and subjecting the coated body to flame action to effect a uniform distribution and smoothing of the remaining coating upon every portion of the surface of the body.

19. The process of galvanizing wire which comprises the successive steps continuously performed of coating the wire by advancing the same through a molten metallic bath whose fluidity is closely controlled at approximately plus or minus five degrees of the bath temperature, removing from the wire all molten metal in excess of that finally to remain thereupon, and flame-treating the coated wire to effect a uniform distribution and smoothing of the remaining coating upon every portion of the surface of the wire.

20. The process of galvanizing wire which comprises the successive steps continuously performed of coating the wire by advancing the same through a molten metallic bath in which the wire acquires a coating, regulating the amount of coating to remain upon the wire, and flame-treating the regulated coating without the removal of coating from the wire to effect a uniform distribution and smoothing of the coating upon every portion of the surface of the wire.

21. The process of continuously galvanizing wire which comprises the steps of drawing a wire through a molten coating bath and closely controlling the bath temperature at a desired point to render the applied coating of uniform fluidity, regulating the amount of coating upon the wire to a desired weight per unit of surface area in accordance with the fluidity of the applied coating, and in subjecting the coated wire so treated to the action of a flame applied for a time interval sufficient to evenly distribute and smooth all the remaining coating over every portion of the wire surface.

22. In the art of continuously galvanizing wire which comprises means for coating and wiping the wire including a molten coating bath, a coating regulator, and a flame, means to closely control the bath temperature at a desired point to render the applied coating of uniform fluidity, means to adjust the coating regulator in accordance with the fluidity of the applied coating, whereby to reduce the coating to a desired amount and weight per unit of surface area, and means to cause the flame to act upon the regulated coating upon the wire for a time interval sufficient to evenly distribute and smooth all the remaining coating over every portion of the wire surface.

23. The process of continuously galvanizing wire which comprises the steps of advancing a wire through a molten coating bath of controlled temperature, regulating the applied coating as required by its fluidity to reduce the coating to a desired amount and weight per unit of surface area, applying a flame over a material extent of regulated coating upon the wire, and in so coordinating the steps of coating regulation and flame application that the molten coating applied to the wire is reduced in amount and weight to a point at which the flame will evenly distribute and smooth all the remaining molten coating over every portion of the wire surface.

24. In the art of continuously galvanizing wire, a molten coating bath, means to draw the wire through the coating bath, a coating regulator, means to adjust the regulator in accordance with the fluidity of the applied coating to reduce such coating to a desired amount and weight per unit of surface area, and means to apply a flame in regulable extent upon the reduced coating of the wire, the regulator adjustment and flame application being so co-ordinated that the molten coating applied to the wire is reduced by the regulator in amount and weight to a point at which the flame will evenly distribute and smooth all the remaining molten coating over every portion of the wire surface.

25. The process of galvanizing wire which comprises the successive steps of coating a wire with a molten metal, removing molten coating from the wire to reduce the coating to a desired amount and weight per unit of surface area, and flame-treating the coated wire without the removal of any of the coating therefrom to evenly distribute and smooth the remaining coating over every portion of the wire surface.

26. The process of galvanizing wire which comprises passing a wire through a molten metallic bath in a linear direction, directing a flame upon one side of the coated wire so as to extend beyond the other side of the wire, and repeatedly redirecting the flame travel from opposite sides of the wire for repeated impingement upon every portion of the molten coating for a material extent in the direction of travel of the wire.

JULIAN L. SCHUELER.